US008778449B2

(12) United States Patent
Tontrup et al.

(10) Patent No.: US 8,778,449 B2
(45) Date of Patent: Jul. 15, 2014

(54) DISPERSION, SLURRY AND PROCESS FOR PRODUCING A CASTING MOULD FOR PRECISION CASTING USING THE SLURRY

(75) Inventors: Christoph Tontrup, Alzenau (DE); Wolfgang Lortz, Waechtersbach (DE); Gabriele Perlet, Grosskrotzenburg (DE); Erich Schmidt-Kluge, Villach (AT); Danilo Frulli, Enghien les Bains (FR)

(73) Assignees: Evonik Degussa GmbH, Essen (DE); Center for Abrasives and Refractories Research & Development C.A.R.R.D. GmbH, Villach (AT)

( * ) Notice: Subject to any disclaimer, the term of this patent is extended or adjusted under 35 U.S.C. 154(b) by 387 days.

(21) Appl. No.: 13/266,512

(22) PCT Filed: Mar. 30, 2010

(86) PCT No.: PCT/EP2010/054184
§ 371 (c)(1),
(2), (4) Date: Dec. 21, 2011

(87) PCT Pub. No.: WO2010/124920
PCT Pub. Date: Nov. 4, 2010

(65) Prior Publication Data
US 2012/0111224 A1 May 10, 2012

Related U.S. Application Data

(60) Provisional application No. 61/184,326, filed on Jun. 5, 2009.

(30) Foreign Application Priority Data

Apr. 30, 2009 (EP) .................... 09005986

(51) Int. Cl.
B22C 1/00 (2006.01)
B22C 1/08 (2006.01)
B22C 1/18 (2006.01)
B22C 9/00 (2006.01)
B22C 9/02 (2006.01)
B22C 9/04 (2006.01)
B05D 1/18 (2006.01)
B05D 3/00 (2006.01)
B05D 3/12 (2006.01)
C08K 3/22 (2006.01)
C01F 7/02 (2006.01)

(52) U.S. Cl.
CPC ... *B22C 1/00* (2013.01); *B22C 1/08* (2013.01); *B22C 1/18* (2013.01); *B22C 9/00* (2013.01); *B22C 9/02* (2013.01); *B22C 9/04* (2013.01); *B05D 1/18* (2013.01); *B05D 3/00* (2013.01); *B05D 3/12* (2013.01); *C08K 3/22* (2013.01); *C01F 7/025* (2013.01)
USPC ............. 427/133; 106/38.22; 106/38.27; 106/38.9; 106/286.3; 106/286.4; 106/286.5; 106/287.17; 106/401; 106/450; 106/483; 524/430

(58) Field of Classification Search
USPC .............. 106/38.2, 38.22, 38.27, 38.9, 286.3, 106/286.4, 286.5, 287.17, 401, 450, 483; 427/133; 524/430
See application file for complete search history.

(56) References Cited

U.S. PATENT DOCUMENTS

| 3,933,190 | A | 1/1976 | Fassler et al. |
| 4,188,450 | A | 2/1980 | Greskovich |
| 4,196,769 | A | 4/1980 | Feagin |
| 4,247,333 | A | 1/1981 | Ledder et al. |
| 4,948,765 | A | 8/1990 | Snook |
| 5,297,615 | A | 3/1994 | Aimone et al. |
| 6,345,663 | B1 | 2/2002 | Klug et al. |
| 8,562,733 | B2 * | 10/2013 | Lortz et al. ............ 106/286.5 |
| 2002/0160692 | A1 * | 10/2002 | Rivoire et al. .......... 451/41 |
| 2003/0124321 | A1 * | 7/2003 | Schneider et al. ....... 428/195 |
| 2004/0126572 | A1 * | 7/2004 | Morris et al. ........... 428/328 |
| 2008/0207091 | A1 * | 8/2008 | Jeng et al. ............. 451/37 |
| 2008/0258358 | A1 * | 10/2008 | Oswald et al. .......... 264/651 |
| 2008/0264299 | A1 | 10/2008 | Lortz et al. |

FOREIGN PATENT DOCUMENTS

| CN | 1454943 A | 11/2003 |
| CN | 1250360 C | 4/2006 |
| DE | 29 09 844 | 9/1979 |

(Continued)

OTHER PUBLICATIONS

Search Report issued Apr. 11, 2013 in Chinese Application No. 201080019060.8 (English Translation).
Office Action issued Jan. 17, 2013 in Korean Patent Application No. 10-2011-7025687 with English language translation.
Storozhenko, P. A., et al., "Chelated Alkoxyalumoxanes and a Silica-Free Binder Based on Them," Inorganic Materials, vol. 43, No. 3, pp. 320-328, (Mar. 2007) XP002581852.
Jia, Q., et al., "A study of two refractories as mould materials for investment casting TiAl based alloys," Journal of Materials Science, vol. 41, No. 10, pp. 3045-3049, (Mar. 28, 2006) XP019399529.
Boccaccini, A. R., et al., "Mullite fabrication from fumed silica and boehmite sol precursors," Materials Letters, vol. 29, No. 1-3, pp. 171-176, (Nov. 1, 1996) XP004065591.

(Continued)

*Primary Examiner* — Anthony J Green
(74) *Attorney, Agent, or Firm* — Oblon, Spivak, McClelland, Maier & Neustadt, L.L.P.

(57) ABSTRACT

Slurry which contains a) from (50) to (80)% by weight of refractory particles having an average particle size of from (0.5) m to (150) m, b) from (5) to (35)% by weight of aluminum oxide particles having an average particle diameter of less than (300) nm and c) from (5) to (35)% by weight of water and d) a pH of from (5) to (12). Process for producing the slurry using a dispersion, and also the dispersion itself. Process for producing a casting mold, and also the casting mold itself.

19 Claims, No Drawings

(56) References Cited

FOREIGN PATENT DOCUMENTS

| | | |
|---|---|---|
| EP | 0 462 176 | 5/1995 |
| EP | 1 207 975 B1 | 5/2004 |
| KR | 10-0668574 | 7/2000 |
| WO | WO2008022835 A1 * | 2/2008 |
| WO | WO 2010/124920 A1 | 11/2010 |

OTHER PUBLICATIONS

Boccaccini, A. R., et al., "Activation energy for the mullitization of a diphasic gel obtained from fumed silica and boehmite sol," Materials Letters, vol. 38, No. 2, pp. 116-120, (Jan. 1, 1999) XP004256068.
International Search Report Issued Jul. 23, 2010 in PCT/EP10/054184 Filed Mar. 30, 2010.

* cited by examiner

DISPERSION, SLURRY AND PROCESS FOR PRODUCING A CASTING MOULD FOR PRECISION CASTING USING THE SLURRY

This application is a National Stage of PCT/EP10/054,184 filed Mar. 30, 2010 and claims the benefit of U.S. 61/184,326 filed Jun. 5, 2009 and EP 09005986.6 filed Apr. 30, 2009.

The present invention relates to a dispersion, a slurry, a process for producing a casting mould for precision casting and also a casting mould which can be obtained by this process.

One form of precision casting for metals is "investment casting", also known as the lost wax process. Here, a model of the workpiece to be produced later is firstly made from wax or other materials which are easy to shape and melt, e.g. plastics or urea. The model is then provided with pouring or venting channels and subsequently encased in the moulded material. The model is melted out of the green mould formed here so as to produce a hollow mould which can subsequently be fired if appropriate. Molten metal is then poured into this hollow space in the mould and solidified in the casting mould, so that the raw casting can be obtained after removal of the casting mould.

To obtain the casting, the casting mould is broken and the raw casting subsequently undergoes finishing. This casting technique is used especially where the workpiece has to meet demanding requirements in terms of precision, large numbers of reproductions are required and complicated shapes are to be produced.

Production of the casting mould requires the positive of the casting modelled from wax or plastic, a slurry comprising a binder, refractory particles and, if appropriate, additives and also refractory particles for sanding, called "stucco", namely for coating the wax shape which has been wetted with slurry.

Depending on the type of metal casting, the casting mould has to meet different requirements. Thus, ceramic casting moulds which are highly refractory and heat resistant are used for, in particular, the casting of superalloys or for single crystal casting.

Various publications describe numerous casting mould compositions which are suitable for high-temperature investment casting processes. Thus, U.S. Pat. No. 4,188,450 describes a refractory composition for a casting mould which consists essentially of aluminium oxide and a binder based on silicon dioxide, with mullite being formed during a sintering step above 1400° C. in the production of the casting mould. A disadvantage of such casting moulds is that silicon dioxide or mullite frequently reacts with the alloy constituents and is thus ruled out for many shaping processes or requires complicated surface treatment of the casting.

U.S. Pat. No. 4,247,333 describes a process for producing casting moulds, in which aluminium oxide is likewise used as refractory powder and the binder based on silicon dioxide is removed during firing of the casting mould as a result of firing being carried out under reducing conditions. It is said that a casting mould consisting entirely of aluminium oxide can be produced in this way. A disadvantage of this process is that it is costly and time-consuming.

DE 2909844 discloses a process for producing a casting mould, in which a fibrous colloidal alumina sol is used as a binder. A disadvantage of this process is the fact that the alumina sol displays only in a narrow pH range an adequate stability against gelling. A mixture for producing casting moulds comprising refractory materials that display a basic character and the acidic alumina sol causes an instability. The instability manifest itself for example in complete gelling of the mixture. In addition the instability does not result in an acceptable quality of the casting mould, e.g. in the form of inhomogeneity and cracks. If at all, these problems may be reduced by a continuous measurement of the pH and its correction by dosage of acid. Such a procedure is not feasible in practice.

It is therefore an object of the present invention to provide a slurry and a process for producing a casting mould for precision casting which do not have the disadvantages of the prior art.

A further object of the present invention is to provide a dispersion for producing the slurry.

Another object of the present invention is to provide a casting mould produced by this process.

The invention provides a slurry which contains
a) from 50 to 80% by weight, preferably from 60 to 75% by weight, of refractory particles having an average particle size of from 0.5 µm to 150 µm, preferably from 5 to 40 µm,
b) from 5 to 35% by weight, preferably from 10 to 20% by weight, of aluminium oxide particles having an average particle diameter of less than 300 nm, preferably from 10 to 200 nm and particularly preferably from 60 to 120 nm,
c) from 5 to 35% by weight of water, preferably from 10 to 25% by weight, and has
d) a pH of from 5 to 12, preferably from 7.5 to 11.

The percentages by weight are based on the sum of the constituents a) to c). The slurry can additionally contain further constituents.

The slurry of the invention is a slurry which has an extremely high stability with respect to viscosity increase, settling and gelling. The stability of the slurry is probably due in large parts to a combination of the features particle diameter and pH.

The BET surface area of the aluminium oxide particles having an average particle diameter of less than 300 nm which are present in the slurry of the invention is not critical. In general, the BET surface area is from 20 to 200 m$^2$/g, preferably from 50 to 120 m$^2$/g. The particles can be present either as isolated individual particles or as aggregated particles. Mixed forms are likewise possible.

As aluminium oxide particles having an average diameter of less than 300 nm, it is possible to use, for example, boehmites or pseudoboehmites. The best results when the slurry of the invention is used for producing casting moulds are obtained with pyrogenic aluminium oxide particles. These are then predominantly or exclusively present in aggregated form. For the purposes of the present invention, aggregates are primary particles which are firmly grown onto one another. These aggregates can be broken up only with difficulty or not at all by means of dispersing apparatuses. A plurality of aggregates can be loosely attached to one another to form agglomerates, and this phenomenon can be reversed by means of an appropriate dispersing process. The average aggregate diameter can be determined by means of methods known to those skilled in the art, e.g. light scattering or counting of aggregates in transmission electron micrographs.

For the purposes of the present invention, pyrogenic means that the particles have been obtained by means of flame hydrolysis or flame oxidation. Here, very finely divided, non-porous primary particles are formed first and these grow together to form aggregates during the further course of the reaction. The surfaces of these particles can have acidic or basic sites.

To increase the stability of the slurry of the invention further, a buffered pH has been found to be advantageous. A buffer which comprises one or more at least dibasic carboxylic acids and at least one salt of a di(alkali metal) hydrogenphosphate and/or alkali metal hydrogenphosphate is particularly suitable for this purpose. The proportion of the buffer constituents is preferably, in each case independently of one another, from 0.3 to $3\times10^{-6}$ mol/m$^2$ of specific surface area of the aluminium oxide.

Furthermore, the slurry of the invention can contain up to 10% by weight, based on the total weight of the slurry, of one or more additives. These include antifoams, wetting agents, polymers, e.g. in form of dispersions, polyphosphates, metal-organic compounds and antibacterial agents. The proportion of antifoams, wetting agents, polyphosphates, metal-organic compounds and antibacterial agents can preferably be, in each case, from 0.01 to 5% by weight and particularly preferably from 0.1 to 1% by weight. The proportion of the polymer is preferably from 1 to 5% by weight.

In a particularly preferred embodiment, the slurry of the invention contains one or more polyphosphates. In the context of the present mode of operation, it has been found that, in particular, the strength of the casting mould can be increased by addition of polyphosphates as additional additives. This effect is possibly attributable to the polyphosphates forming three-dimensional polymeric networks with the aluminium oxide particles having an average particle diameter of less than 300 nm during production of the casting mould. In a particularly advantageous embodiment of the present invention, the slurry contains from 0.05% by weight to 2.0% by weight of sodium tripolyphosphate.

Suitable polymers are neoprene polymers, urethane polymers, acryl latex polymers and styrene butadiene latex polymers.

The refractory particles having an average particle size of from 0.5 µm to 150 µm which are present in the slurry of the invention are preferably selected from the group consisting of aluminium oxide, zirconium oxide, mullite, andalusite, zirconium mullite, stabilized zirconium oxide, yttrium oxide, cobalt oxide, cobalt-aluminium spinel and rare earth oxides. Particular preference is given to α-aluminium oxide, for example in the form of fused alumina. Very particular preference is given to using white high-purity α-alumina having a content of aluminium oxide based on the ashing residue of greater than 99% or brown standard α-alumina having a content of aluminium oxide of greater than 95%. Furthermore, owing to its content of silicon dioxide based on the ashing residue of less than 0.1%, white high-purity α-alumina can be preferred over brown α-alumina for the casting of particular metals. Both fused alumina grades are characterized by the virtually complete absence of open porosity.

A particular advantage of the slurry of the invention is its stability with respect to viscosity, gelling, sedimentation and bacterial decomposition.

As a rule the slurry according to the invention displays a stability of at least 12 hours, preferably at least 2 days.

The invention further provides a process for producing the slurry of the invention, in which an aqueous dispersion which contains
  a1) aluminium oxide particles having an average particle diameter of less than 300 nm as solid and
  a2) has a content of aluminium oxide particles of more than 15% by weight, preferably from 25 to 70% by weight, particularly preferably from 35 to 60% by weight, and has
  a3) a pH of from 5 to 12, preferably from 7.5 to 9, more preferably 7.5 to 8.5, is admixed with
  b) refractory particles having an average particle size of from 0.5 µm to 150 µm and
  c) if appropriate, additives.

Due to the high solids content of the alumina particles the process according to the invention allows a rapid drying of the slurry when producing a casting mould. In addition the process according to the invention allows a fast slurry make up using low shear conditions.

Thus a fast slurry make up can be achieved, as a rule within a period of maximal 12 hours, preferably of less than 5 hours. this is a considerable improvement over the state of the art, where at least 1 day is necessary for the slurry make up.

The aluminium oxide particles are preferably aggregated aluminium oxide particles and particularly preferably pyrogenic aluminium oxide particles. Furthermore, the dispersion used can be buffered. A buffer comprising one or more at least dibasic carboxylic acids, for example citric acid or tartaric acid, and at least one salt of a di(alkali metal) hydrogenphosphate and/or alkali metal hydrogenphosphate, where the proportion of the buffer constituents is, in each case independently of one another, from 0.3 to $3\times10^{-6}$ mol/m$^2$ of specific surface area of aluminium oxide, can be used for this purpose.

The zeta potential of the dispersion used is preferably below −15 mV. Particular preference is given to a zeta potential in the range from −25 to −40 mV.

The zeta potential is a measure of the surface charge on the particles, which can be influenced by substances which become attached to the surface. For the purposes of the present invention, the zeta potential is the potential at the shear plane within the electrochemical aluminium oxide particle/electrolyte double layer in the dispersion. The zeta potential can, for example, be determined by measuring the colloidal vibration current (CVI) of the dispersion or by determining the electrophoretic mobility.

Furthermore, it is possible to use one or more additives. These encompass antifoams, wetting agents, polymers as mentioned before, binders, polyphosphates, metal-organic compounds, refractory fibres and antibacterial agents. Antifoams, wetting agents, polyphosphates, metal-organic compounds and antibacterial agents are preferably used in proportions of from 0.01 to 5% by weight and particularly preferably in proportions of from 0.1 to 1% by weight, in each case based on the slurry. In a particularly preferred embodiment, from 0.05 to 2% by weight of sodium tripolyphosphate are used. The polymer can preferably be used in a proportion of from 1 to 5% by weight, based on the slurry.

Suitable refractory fibres can be aramide fibres, carbon fibres, metal fibres, ceramic fibres, nitride fibres, carbide fibres, glass fibres, polymer fibres or cellulose fibres.

In a particular embodiment of the process, individual or all additives are constituents of the dispersion.

The invention further provides an aqueous dispersion of aluminium oxide particles, in which
  a) the aluminium oxide particles have an average particle diameter of less than 300 nm,
  b) the content of aluminium oxide particles is more than 15% by weight, preferably from 25 to 70% by weight, particularly preferably from 35 to 60% by weight,
  c) the dispersion additionally contains one or more additives selected from the group consisting of antifoams, wetting agents, polymers, polyphosphates, metal-organic compounds and antibacterial agents and
  d) the dispersion contains a buffer system and has a pH of from 5 to 12, preferably from 7.5 to 9, more preferably 7.5 to 8.5.

A suitable buffer system contains, for example, one or more at least dibasic carboxylic acids and at least one salt of a di(alkali metal) hydrogenphosphate and/or alkali metal hydrogenphosphate, where the proportion is, in each case independently of one another, from 0.3 to $3\times10^{-6}$ mol/m$^2$ of specific surface area of the aluminium oxide.

The zeta potential of the dispersion of the invention is preferably less than −15 mV. In a particularly preferred embodiment, the zeta potential is from −25 to −40 mV.

The dispersion according to the invention displays a especially good compatibility with the polymers.

The invention further provides a process for producing a casting mould, in particular for precision casting, which comprises the steps a) dipping of a preshaped meltable model into the slurry of the invention,
b) coating of the surface of the model which is covered with the slurry by sanding with coarse, refractory particles having an average particle size of from >50 μm to 1000 μm, preferably >100 μm to 400 μm, and
c) drying of the coated surface, where the steps a) to c) are repeated as often as desired until the number of coating layers required for the casting mould has been reached.

The coarse, refractory particles having an average particle size of from >50 μm to 1000 μm which are used for sanding the surface covered with the slurry are preferably likewise selected from the group consisting of aluminium oxide, zirconium oxide, mullite, andalusite, zirconium mullite, stabilized zirconium oxide, yttrium oxide and rare earth oxides.

In a particularly preferred embodiment of the process of the invention, aluminium oxide particles are used both as refractory particles having an average particle size of from 5 μm to 40 μm and as coarse, refractory particles having an average particle size of from >100 μm to 200 μm.

In general, the process of the invention comprises a sintering step after the last drying step. This gives the casting mould obtained sufficient strength for its later use. However, it is also possible to carry out the process without an additional sintering step and to strengthen the casting mould obtained "in situ" during precision casting.

The use of the slurry of the invention makes it possible to achieve very constant drying rates. This means that drying of the casting mould occurs very gently, so that the casting mould does not suffer any damage.

The invention further provides a casting mould, in particular for precision casting, which can be obtained by this process.

The present invention encompasses three types of particles, namely refractory particles having an average particle size of from 0.5 to 150 μm, coarse refractory particles having an average particle size of from >50 to 1000 μm and aluminium oxide particles having an average particle diameter of less than 300 nm.

The casting mould preferably comprises at least 98% by weight, based on the asking residue, of aluminium oxide.

Furthermore, a casting mould which is essentially free of silicon dioxide can be advantageous. For the present purposes, this means that the proportion of silicon dioxide is not more than 2% by weight, preferably not more than 0.5% by weight and particularly preferably not more than 0.1%.

Furthermore, a casting mould whose aluminium oxide particles having an average particle diameter of less than 300 nm are pyrogenic aluminium oxide particles can be advantageous.

The sintering temperatures required for a casting mould according to the invention which consists essentially of aluminium oxide, i.e. comprises at least 98% by weight of aluminium oxide, are usually about 900-1400° C., preferably about 1350° C., and mechanical properties of the casting mould which are comparable to those of a casting mould which has been conventionally produced on the basis of binders containing silicon dioxide can be achieved after a sintering time of about 3 hours. However the casting mould of the invention has the advantage over a conventional casting mould that it is largely chemically inert and can therefore be used for virtually all superalloys.

EXAMPLES

Production of Dispersion 1

Deionized water is placed in a 60 l stainless steel make-up vessel. Aluminium oxide powder (1) is subsequently sucked in under shear conditions by means of the suction tube of an Ystral Conti-TDS 3 (stator slits: 4 mm ring and 1 mm ring, rotor-stator spacing about 1 mm).

A buffer solution of anhydrous citric acid, disodium hydrogenphosphate dihydrate and water is then added and further aluminium oxide powder (2) is sucked in.

After the introduction is complete, the suction port is closed and the mixture is sheared at 3000 rpm for another 10 minutes. After milling is complete, a preservative is added.

This predispersion is passed twice through a Sugino Ultimaizer HJP-25050 high-energy mill at a pressure of 2500 bar and diamond nozzles having a diameter of 0.3 mm and is in this way subjected to further intensive milling.

TABLE 1

| Dispersion 1 | | |
|---|---|---|
| Dispersion | | 1 |
| Deionized water | kg | 41.1 |
| Al$_2$O$_3$ powder | | AEROXIDE ® Alu C* |
| (1) | kg | 5.8 |
| (2) | kg | 28.2 |
| Buffer solution | | |
| Citric acid | kg | 1.70 |
| Na$_2$HPO$_4$ dihydrate | kg | 1.42 |
| Water | kg | 6.70 |
| Preservative | | Acticide ® MV** |
| | g | 77 |
| pH after 48 h | | 7.5 |
| Solids content | % by weight | 40 |
| av. particle diameter | nm | 86 |

*from Evonik Degussa GmbH;
**from THOR

Production of the Slurry
Slurry 2a:

To produce the slurry, 3 kg from Example 1 are placed in a reaction vessel and a total of 7 kg of electrofused α-alumina (aluminium oxide white WRG, Treibacher Schleifmittel) screened to from 0 to 325 mesh are added a little at a time. 0.075% by weight of a wetting agent based on alcohol alkoxide (TEGO SURTEN W 111, EVONIK Industries) and 0.02% by weight of an antifoam (Burst 100, REMET) are subsequently added.

The mixture obtained in this way is stirred at a low shear rate until the viscosity measured by means of a "Zahn4" flow cup has reached a value of from 18 to 23 seconds.

In this type of viscosity measurement, the liquid to be measured is introduced to a particular fill height into a horizontally aligned viscosity cup which has an outflow nozzle on its underside which is initially closed, for example by means of a glass plate, after introduction of the liquid. The time measurement commences as soon as the outflow nozzle is opened by removal of the glass plate. The kinematic viscosity is measured in seconds over the time until the outflow stream breaks for the first time and can then be converted into Centistokes (cST). In such viscosity measurements, different types of cup can be used depending on the measurement range or measurement method. In the present case, an ELCOMETER® 2210 Zahn flow cup having a nozzle size 4 was used. Stabilization of the viscosity was effected by targeted addition of dispersion, water or refractory particles.

The slurry produced in this way can be used in the customary fashion for the production of casting moulds.

Slurry 2b:

Analogous to slurry 2a but with addition of 0.1% by weight of sodium tripolyphosphate.

Slurry 2c:

Analogous to slurry 2b but varied with 0.43% by weight of sodium tripolyphosphate.

Production of the Casting Mould

Casting Mould 3a:

To produce the casting mould, a wax model based on RW 161 (from REMET) which is provided with a handle and has the dimensions 50 mm×80 mm×3 mm is used and is, in a first coating step, dipped into the slurry from Example 2a for 8 seconds, with the handle not being completely covered with slurry so as to make later melting-out of the wax possible. The model which has been coated in this way with slurry is allowed to drip for about 18 seconds and then exposed to a sand stream of coarse, refractory particles of aluminium oxide ALODUR® ZWSK 90 (Treibacher Schleifmittel) falling from a height of about 30 cm until no more particles adhere to the surface. Subsequent drying is carried out for 12 hours at room temperature and an atmospheric humidity of 30-60%. The model is then dipped into the slurry again and the slurry-coated model is sanded under the same conditions with somewhat coarser refractory particles (aluminium oxide ALODUR® ZWSK 60, Treibacher Schleifmittel). The subsequent drying at room temperature and at atmospheric humidity of 30-60% is shortened to 3 hours.

After this intermediate layer, two further support layers are applied using coarser refractory particles (aluminium oxide ALODUR® ZWSK 30, Treibacher Schleifmittel). The support layers are dried for 3 hours. The final layer is subsequently applied by simple dipping of the model into the slurry without further sanding with coarse, refractory particles.

This gives a casting mould having a layer thickness of 3.7-4.2 mm whose wax core is melted out in an oven at 100° C.

Casting Mould 3b:

Analogous to Example 3a but using slurry 2b.

Casting Mould 3c:

Analogous to Example 3a but using slurry 2c.

Comparative Example

Slurry (4Ba) for the Primary Layer

To produce a slurry for the primary layer, 18% by weight of a commercially available finished binder are admixed with 82% by weight of zircon sand (ZrSiO$_4$) screened to 0-325 mesh. As binder, use is made of REMASOL® ABOND® (from REMET) which consists essentially of about 30% by weight of colloidal silica and about 70% by weight of water.

Slurry (4Bb) for the Intermediate and Support Layers

To produce the slurry, 18% by weight of a commercially available finished binder based on colloidal silica (REMASOL® SP-ULTRA 2408, from REMET) are admixed with 82% by weight of molochite (aluminium silicate) screened to 200 mesh. The binder comprises 34% by weight of colloidal silica and 66% by weight of water.

Casting Mould 4a:

In the two abovementioned cases, the amount of the coarse, refractory particles is firstly divided into portions and then added in portions, with the viscosity of the slurry 4ba for the primary coating being set to 18-24 seconds (measured by ELCOMETER® 2210 Zahn 4 flow cup) while the viscosity of the slurry 4bb for the intermediate and support layers was set to 8-10 seconds. The amount of liquid which evaporated during the setting of the viscosity is replaced by addition of water. The pH is 8-10.5.

The casting mould is produced in a manner analogous to the casting mould 3a, with an equivalent model being firstly dipped for 8 seconds into the slurry for the primary layer and subsequently, after being allowed to drip, sanded with zircon sand as refractory particles in a particle size of 100-200 μm. Molochite 30-80 mesh are used as coarse, refractory particles for the intermediate layer, while molochite 16-30 mesh is used for the two support layers. The final layer was formed using the slurry 4bb without additional sanding.

Here too, the layer thickness was 3.7-4.2 mm. The wax core is melted out at 100° C. in an oven.

Sintered Casting Moulds:

The casting moulds 3a, 3b, 3c and 4a are dried and sintered at various temperatures to form the casting moulds 3aa, 3ba, 3ca and 4aa and then tested to determine their mechanical strength and also their gas permeability. The corresponding test results are summarized in Tables 2 and 3.

TABLE 2

Cold Modulus Of Rupture (CMOR) of the casting moulds

| Casting mould | CMOR [N/mm$^2$] | | |
| --- | --- | --- | --- |
|  | 120° C. | 1100° C. | 1350° C. |
| 3aa | 2.3 | 0.8 | 4.7 |
| 3ba | 4.5 | 3.4 | 10.1 |
| 3ca | 10.0 | 7.8 | 19.2 |
| 4aa* | 2.3 | 7.2 | 14.0 |

*Comparison

TABLE 3

Gas permeability of the casting moulds 3aa and 4aa

| Temperature [° C.] | Gas permeability [L/min] | |
| --- | --- | --- |
|  | 3aa | 4aa* |
| 950 | 0.22 | 0.28 |
| 1000 | 0.23 | 0.29 |
| 1050 | 0.36 | 0.42 |
| 1100 | 0.55 | 0.50 |
| 1150 | 0.74 | 0.78 |

*Comparison

The strength is determined in a three-point bending test using test specimens which are dried at 120° C. or sintered at 1100° C. or 1350° C. The specimen containing 0.43% by weight of sodium tripolyphosphate displays the highest strength values of all specimens at all treatment temperatures.

It should, however, be remarked that the strength is not the only criterion for the suitability of a mould for precision casting. Although high strengths guarantee the durability of the mould during casting, which is an indispensable prerequisite for use of the casting mould, excessively high strengths at the same time make subsequent removal of the mould more difficult.

The comparative specimen 4aa, which has sufficient strength, can be used as a guide to the strength required for precision casting.

In summary, it can be stated that the process of the invention makes it possible, by means of targeted heat treatment and, if appropriate, addition of additives such as sodium tripolyphosphate, to obtain a casting mould which is sufficiently strong for precision casting and is virtually free of silicon dioxide.

Compared to the process disclosed in U.S. Pat. No. 5,297,615, the present invention allows simpler production of a casting mould composed of aluminium oxide and having good strength values.

Compared to the slurry used in U.S. Pat. No. 5,297,615, the slurry of the invention has a high stability.

From the results shown in Table 3, which are based on measurements carried out by a method based on British Standard (BS 1902; Section 10.2; 1994), it can be seen that gas permeability values comparable to those of standard materials for casting moulds are also achieved.

Example 5

Drying Rate

Table 4 shows the drying rate of a topcoat (i.e. first layer on the wax model) for the slurry 2b according to the invention and the comparative slurry 4ba. The drying rate describes the percentage decrease in weight of the moist layer at a temperature of 25° C. and a relative atmospheric humidity of 75%.

TABLE 4

| | Drying rate (in % by weight) | |
|---|---|---|
| Time [min] | Slurry 4ab | Slurry 2b |
| 5 | 100 | 100 |
| 15 | 98.1 | 99.3 |
| 25 | 97.1 | 98.5 |
| 35 | 96.5 | 97.8 |
| 50 | 96.2 | 97.2 |
| 65 | 96.0 | 96.9 |
| 95 | 95.8 | 96.3 |
| 125 | 95.7 | 95.9 |
| 155 | 95.6 | 95.7 |
| 185 | 95.5 | 95.6 |
| 215 | 95.4 | 95.5 |

It is clear from Table 4 that the decrease in weight of the layer of the slurry 4ba proceeds more quickly (i.e. at high drying rates) in the first 100 minutes but then approximates that of the slurry 2b according to the invention. A very rapid drying rate in the first minutes is undesirable since this results in massive heat adsorption and shrinkage of the wax pattern and therefore damage the casting mould. For this reason, it can be assumed that the drying of the layer of slurry 2b, which occurs with a significantly lower weight loss in the first minutes, is substantially more gentle and a casting mould which has fewer defects is therefore obtained.

The invention claimed is:

1. A slurry, comprising:
   a) from 50 to 80% by weight of refractory particles having an average particle size of from 0.5 μm to 150 μm,
   b) from 5 to 35% by weight of aluminum oxide particles having an average particle diameter of less than 300 nm, and
   c) from 5 to 35% by weight of water,
   wherein the slurry has a pH of from 5 to 12.

2. The slurry of claim 1, wherein the aluminum oxide particles are aggregated.

3. The slurry of claim 1, wherein the aluminum oxide particles are pyrogenic aluminum oxide particles.

4. The slurry of claim 1, wherein the slurry is buffered.

5. The slurry of claim 1, further comprising:
   not more than 10% by weight, based on the total weight of the slurry, of at least one additional additive selected from the group consisting of an antifoam, a wetting agent, a polymer, a polyphosphate, a metal-organic compound, and an antibacterial agent.

6. The slurry of claim 1, wherein the refractory particles have an average particle size of from 0.5 μm to 150 μm and comprise at least one material selected from the group consisting of aluminum oxide, zirconium oxide, mullite, andalusite, zirconium mullite, stabilized zirconium oxide, yttrium oxide, cobalt-aluminum spinel, cobalt oxide, and a rare earth oxide.

7. The slurry of claim 2, wherein the aluminum oxide particles are pyrogenic aluminum oxide particles.

8. The slurry of claim 2, wherein the slurry is buffered.

9. The slurry of claim 2, further comprising:
   not more than 10% by weight, based on the total weight of the slurry, of at least one additional additive selected from the group consisting of an antifoam, a wetting agent, a polymer, a polyphosphate, a metal-organic compound, and an antibacterial agent.

10. The process of claim 4, further comprising:
    not more than 10% by weight, based on the total weight of the slurry, of at least one additional additive selected from the group consisting of an antifoam, a wetting agent, a polymer, a polyphosphate, a metal-organic compound, and an antibacterial agent.

11. A process for producing the slurry of claim 1, comprising:
    admixing an aqueous dispersion comprising more than 15% by weight aluminum oxide particles having an average particle diameter of less than 300 nm
    with
    refractory particles having an average particle size of from 0.5 μm to 150 μm and
    wherein a pH of the aqueous dispersion is from 5 to 12.

12. The process of claim 11, wherein the admixing further comprises adding an additive.

13. A process for producing a casting mold comprising:
    a) dipping a preshaped meltable model into the slurry of claim 1,
    b) coating a surface of the model by sanding with coarse, refractory particles having an average particle size of from 50 μm to 1000 μm to obtain a coated surface and
    c) drying the coated surface,
    where a) to c) are optionally repeated until a number of coating layers required for the casting mold has been reached.

14. The process of claim 13, wherein the coarse, refractory particles comprise at least one material selected from the group consisting of aluminum oxide, zirconium oxide, mullite, andalusite, zirconium mullite, stabilized zirconium oxide, yttrium oxide, cobalt-aluminum spinel, cobalt oxide and a rare earth oxide.

15. A casting mould obtained in a process comprising the process of claim 13.

16. The casting mould of claim 15, wherein an aluminum oxide content is more than 98% by weight.

17. The casting mould of claim 15, comprising no silicon dioxide.

18. The casting mould of claim 15, wherein aluminum oxide particles having an average particle diameter of less than 300 nm are of pyrogenic origin.

19. An aqueous dispersion, comprising:
- more than 15% by weight of aluminum oxide particles having an average particle diameter of less than 300 nm;
- from 0.05 to 2.0% by weight of sodium tripolyphosphate, based on the dispersion;
- at least one additive selected from the group consisting of an antifoam, a wetting agent, a polymer, a polyphosphate, a metal-organic compound, and an antibacterial agent; and
- a buffer system, wherein the dispersion has a pH of from 5 to 12.

* * * * *